US006912436B1

(12) United States Patent
Jones et al.

(10) Patent No.: US 6,912,436 B1
(45) Date of Patent: Jun. 28, 2005

(54) PRIORITIZING AN APPLICATION OF CORRECTION IN A MULTI-INPUT CONTROL SYSTEM

(75) Inventors: Gary Jones, Austin, TX (US); Christopher A. Bode, Austin, TX (US); Richard D. Edwards, Austin, TX (US); Matthew A. Purdy, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 189 days.

(21) Appl. No.: 10/261,156

(22) Filed: Sep. 30, 2002

(51) Int. Cl.⁷ .............................................. G06F 19/00
(52) U.S. Cl. .................... 700/121; 700/95; 700/117; 438/5
(58) Field of Search ............................. 700/29, 30, 28, 700/45, 90, 95, 117, 121; 438/5

(56) References Cited

U.S. PATENT DOCUMENTS

| | | | | |
|---|---|---|---|---|
| 5,408,405 A | * | 4/1995 | Mozumder et al. ........... | 700/31 |
| 5,526,293 A | * | 6/1996 | Mozumder et al. ........... | 716/19 |
| 5,969,972 A | * | 10/1999 | Kerszykowski et al. ..... | 700/121 |
| 6,276,989 B1 | * | 8/2001 | Campbell et al. ............. | 451/10 |
| 6,304,999 B1 | * | 10/2001 | Toprac et al. .................. | 716/4 |
| 6,460,002 B1 | * | 10/2002 | Bone et al. .................... | 702/81 |

OTHER PUBLICATIONS

Hermann et al., "Understanding the Impact of Equipment and Process Changes with a Hetrogeneous Semiconductor Manufacturing Simulation Environment" Proceedings of the 2000 Winter Simulation Conference, pp. 1491–1498.*

* cited by examiner

Primary Examiner—Jayprakash N. Gandhi
(74) Attorney, Agent, or Firm—Williams, Morgan & Amerson, P.C.

(57) ABSTRACT

A method and an apparatus for selectively applying correction to a process control. Manufacturing data relating to the processing of a workpiece is acquired. The manufacturing data includes metrology data relating to the processed workpiece. An adjustment for at least a first or a second control input parameter is determined based upon the manufacturing data. The first and second control input parameters are organized to isolate the first control input parameter from the second control input parameter for adjusting at least one of the first and the second control input parameters, using a controller.

37 Claims, 9 Drawing Sheets

{ } -- Precedent Group
0 -- Control Input Parameter
0 -- Parameter Requires modification
* -- Modified Parameter

BEFORE CHECK

| CASE # | I | II |
|---|---|---|
| 1 | {0 0 0 0 0} | {0 0} |
| 2 | {0 0 0 0 0} | {0 0} |
| 3 | {0 0 0 0 0} | {0 0} |
| 4 | {0 0 0 0 0} | {0 0} |

AFTER CHECK

| CASE # | I | II | | |
|---|---|---|---|---|
| 1 | {0 0 0 0 0} | {0 0} | | |
| 2 | {0 0 * * 0} | {0 0} | OR | {* * * * *} {0 0} |
| 3 | {0 0 0 0 0} | {* 0} | OR | {0 0 0 0 0} {* *} {0 0} |
| 4 | {0 0 * * 0} | {0 0} | OR | {* * * * *} {0 0} |

FIGURE 6

PRIORITIZING AN APPLICATION OF CORRECTION IN A MULTI-INPUT CONTROL SYSTEM

BACKGROUND OF THE INVENTION

1. Field of the Invention

This invention relates generally to semiconductor manufacturing, and, more particularly, to a method and apparatus for preferentially applying correction to a process control system containing multi-inputs.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using the patterned layer of photoresist as a mask. This etching process results in the formation of various features or objects in the process layer. Such features may be used as, for example, a gate electrode structure for transistors. Many times, trench isolation structures are also formed across the substrate of the semiconductor wafer to isolate electrical areas across a semiconductor wafer. One example of an isolation structure that can be used is a shallow trench isolation (STI) structure.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a manufacturing process.

FIG. 1 illustrates a workpiece (e.g., typical semiconductor wafer 105). The semiconductor wafer 105 typically includes a plurality of individual semiconductor die 103 arranged in a grid 150. Using known photolithography processes and equipment, a patterned layer of photoresist may be formed across one or more process layers that are to be patterned. As part of the photolithography process, an exposure process is typically performed by a stepper on approximately one to four die 103 locations at a time, depending on the specific photomask employed. The patterned photoresist layer can be used as a mask during etching processes, wet or dry, performed on the underlying layer or layers of material, e.g., a layer of polysilicon, metal or insulating material, to transfer the desired pattern to the underlying layer. The patterned layer of photoresist is comprised of a plurality of features, e.g., line-type features or opening-type features that are to be replicated in an underlying process layer.

Turning now to FIG. 2, a typical flow of processes performed on a semiconductor wafer 105 by a semiconductor manufacturing system is illustrated. A manufacturing system may process a set of semiconductor wafers 105 in a batch or lot (block 210). The manufacturing system may then acquire metrology data relating to the processed semiconductor wafers 105 (block 220). The manufacturing system may then analyze the metrology data to determine whether any errors detected on the semiconductor wafers 105 are outside an acceptable range of tolerance (block 230).

Upon evaluation of the errors, the manufacturing system may calculate one or more modifications to be made on one or more control input parameters that control the process operation(s) performed by the manufacturing system (block 240). Furthermore, the manufacturing system may then perform subsequent processes based upon modifications to the control input calculated above (block 250).

Among the problems associated with the current methodology includes inadvertent alteration of one control input parameter resulting from a modification made to another control input parameter. Many times, the settings of control input parameters may affect other control input parameters. Therefore, modifications made to one input parameter may affect several subsequent operations performed, some of which are unintended modifications, by the manufacturing system. Therefore, when feedback or feed-forward corrections are made to processes in the manufacturing system, inadvertent adjustments to other control input parameters may occur, leading to possible inaccuracies in processing of semiconductor wafers 105. Increased amounts of inaccuracies on the processed semiconductor wafers 105 may comprise the yield and/or performance of devices manufactured from the processed semiconductor wafers 105.

The present invention is directed to overcoming, or at least reducing, the effects of, one or more of the problems set forth above.

SUMMARY OF THE INVENTION

In one aspect of the present invention, a method is provided for applying correction to a process control. Manufacturing data relating to the processing of a workpiece is acquired. The manufacturing data includes metrology data relating to the processed workpiece. An adjustment for at least a first or a second control input parameter is determined based upon the manufacturing data. The first and second control input parameters are organized to isolate the first control input parameter from the second control input parameter for adjusting at least one of the first and the second control input parameters, using a controller.

In another aspect of the present invention, a method is provided for applying correction to a process control. A workpiece is processed based upon a first, second, and a third control input parameters. Manufacturing data relating to the processing of the workpiece is acquired. The manufacturing data includes metrology data relating to the processed workpiece. An adjustment for at least one of the first, second, and third control input parameters is determined based upon the manufacturing data. The first and second control input parameters are organized for the adjustment and isolation of the third control input parameter for preventing the third control input parameter from being substantially affected by the adjustment, using a controller.

In another aspect of the present invention, a system is provided for applying correction to a process control. The system comprises a processing tool and a process controller operatively coupled to the processing tool. The process controller performs an input parameter group filtering process. The input parameter group filtering process includes creating a plurality of control input parameter lists based upon a relationship between at least two of the control input parameters to isolate at least one control input parameter from another. The input parameter group filtering process also includes selecting at least one of the lists of control input parameters for parameter adjustment based upon a modification precedent.

In another aspect of the present invention, an apparatus is provided for applying correction to a process control. The apparatus comprises a process controller operatively coupled to a processing tool for processing a workpiece. The process controller is capable of performing an input parameter group filtering process. The input parameter group filtering process includes creating a plurality of control input parameter lists based upon a relationship between at least two of the control input parameters to isolate at least one control input parameter from another. The input parameter group filtering process also includes selecting at least one of the lists of control input parameters for parameter adjustment based upon a modification precedent.

In yet another aspect of the present invention, a computer readable program storage device encoded with instructions is provided for applying correction to a process control. The computer readable program storage device encoded with instructions that, when executed by a computer, performs a method, which comprises: acquiring manufacturing data relating to the processing of a workpiece, the manufacturing data including metrology data relating to the processed workpiece; determining an adjustment for at least one of a first and a second control input parameter based upon the manufacturing data; and organizing the first and second control input parameters to isolate the first control input parameter from the second control input parameter for adjusting at least one of the first and the second control input parameters, using a controller.

BRIEF DESCRIPTION OF THE DRAWINGS

The invention may be understood by reference to the following description taken in conjunction with the accompanying drawings, in which like reference numerals identify like elements, and in which:

FIG. 6 provides a graphical illustration of parameter lists indicating modification to parameters, in accordance with one illustrative embodiment of the present invention;

Figure 1:
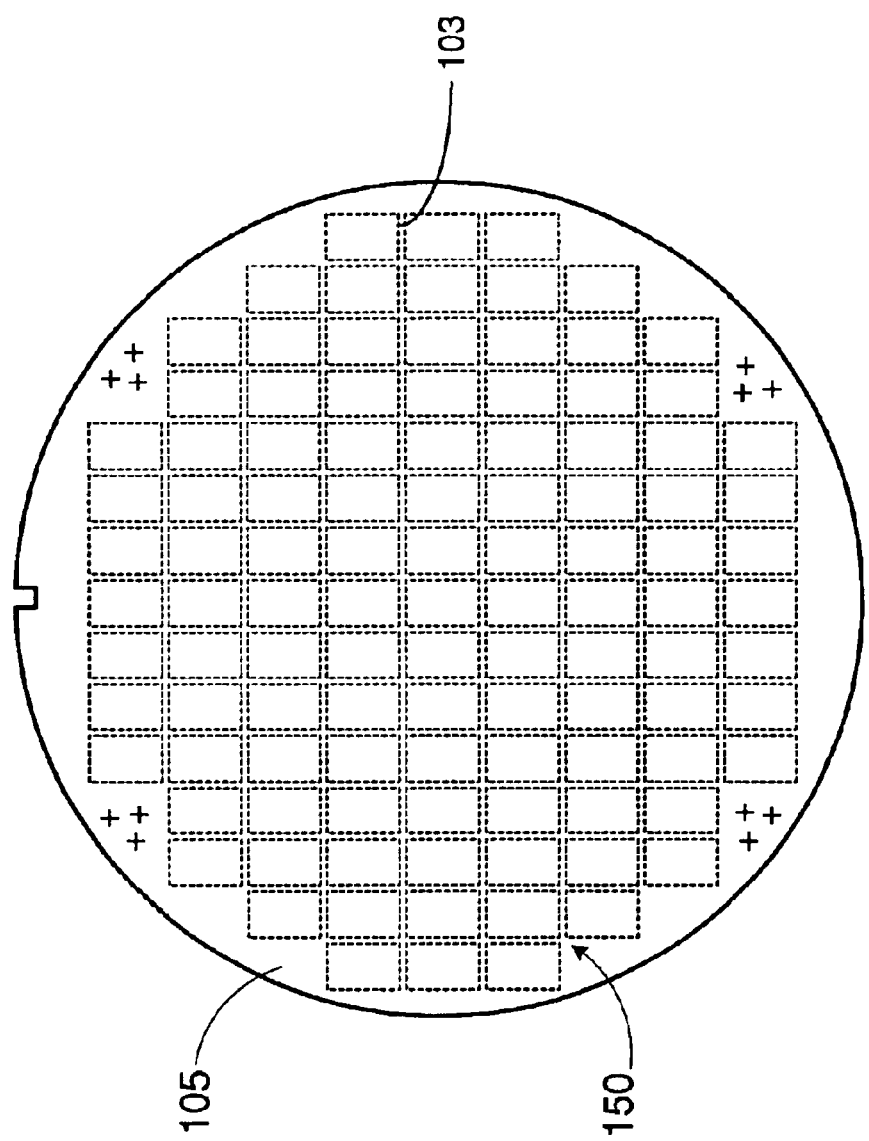
FIG. 1 is a simplified diagram of a prior art semiconductor wafer being processed.
Figure 2:
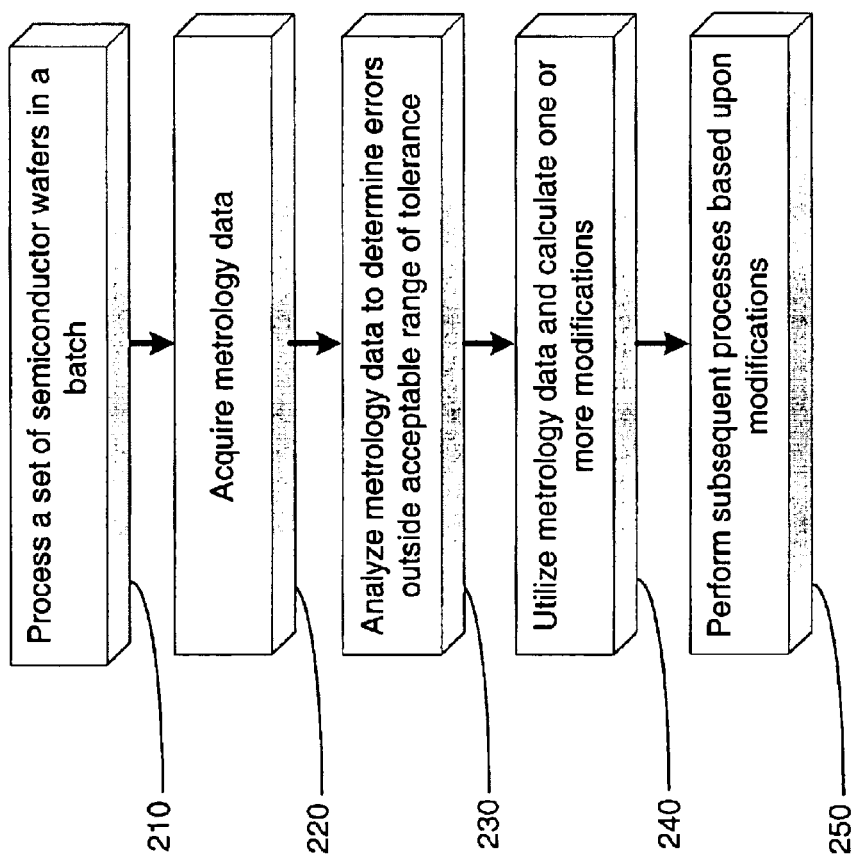
FIG. 2 illustrates a simplified flowchart depiction of a prior art process flow during manufacturing of semiconductor wafers.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

There are many discrete processes that are involved in semiconductor manufacturing. Many times, workpieces (e.g., semiconductor wafers 105, semiconductor devices, etc.) are stepped through multiple manufacturing process tools. Embodiments of the present invention provide for evaluating relationships between a plurality of control input parameters and affecting feedback and/or feed-forward adjustments made to the control input parameters such that inadvertent modification(s) of control input parameter states are reduced. Embodiments of the present invention provide for performing a parameter coupling/decoupling process to group related control input parameters and/or decouple other control input parameters such that efficient control of selected control input parameters may be made while reducing inadvertent modifications to other control input parameter states. An ordering and grouping of control input parameters may be made and given priority and/or precedent for control modifications. Therefore, utilizing embodiments of the present invention, certain control input parameters may be modified while isolating the effects that some control input parameters may have on the state of other control input parameters, thereby increasing the accuracy of feedback and/or feed-forward corrections made to processes performed by a manufacturing system.

There are many discrete processes that are involved in semiconductor manufacturing. Many times, workpieces (e.g., semiconductor wafers 105, semiconductor devices, etc.) are stepped through multiple manufacturing process tools. Embodiments of the present invention provide for evaluating relationships between a plurality of control input parameters and affecting feedback and/or feed-forward adjustments made to the control input parameters such that inadvertent modification(s) of control input parameter states are reduced. Embodiments of the present invention provide for performing a parameter coupling/decoupling process to group related control input parameters and/or decouple other control input parameters such that efficient control of selected control input parameters may be made while reducing inadvertent modifications to other control input parameter states. An ordering and grouping of control input parameters may be made and given priority and/or precedent for control modifications. Therefore, utilizing embodiments of the present invention, certain control input parameters may be modified while isolating the effects that some control input parameters may have on the state of other control input parameters, thereby increasing the accuracy of feedback and/or feed-forward corrections made to processes performed by a manufacturing system.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using the patterned layer of photoresist as a mask. This etching process results in the formation of various features or objects in the process layer. Such features may be used as, for example, a gate electrode structure for transistors. Many times, trench isolation structures are also formed across the substrate of the semiconductor wafer to isolate electrical areas across a semiconductor wafer. One example of an isolation structure that can be used is a shallow trench isolation (STI) structure. Although embodiments of the present invention are discussed in the context of photolithography processes, for clarity of description, other process operations may utilize embodiments of the present invention and may remain within the spirit and scope of the teachings of the present invention.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a manufacturing process.

For photolithography processes, which use processing tools such as steppers, control inputs that are used to operate the processing tools include an x-translation signal, a y-translation signal, an x-expansion wafer scale signal, a y-expansion wafer scale signal, a reticle magnification signal, and a reticle rotation signal.

For photolithography processes, when a process step in a processing tool is concluded, the semiconductor wafer 105 that is being processed may be examined in a review station. One such review station is a KLA review station. One set of data derived from the operation of the review station is a quantitative measure of the amount of misregistration that was caused by the previous exposure process. In one embodiment, the amount of misregistration relates to the misalignment in the process that occurred between two layers of a semiconductor wafer. In one embodiment, the amount of misregistration that occurred can be attributed to the control input parameters and/or to the state of those corresponding parameters for a particular exposure process. The control inputs generally affect the accuracy of the process steps performed by the processing tools on the semiconductor wafer 105. Modifications of the control inputs can be utilized to improve the performance of the process steps employed in the manufacturing tool. Many times, the errors that are found in the processed semiconductor wafers 105 can be correlated to a particular fault analysis and corrective actions can be taken to reduce the errors.

Figure 3:
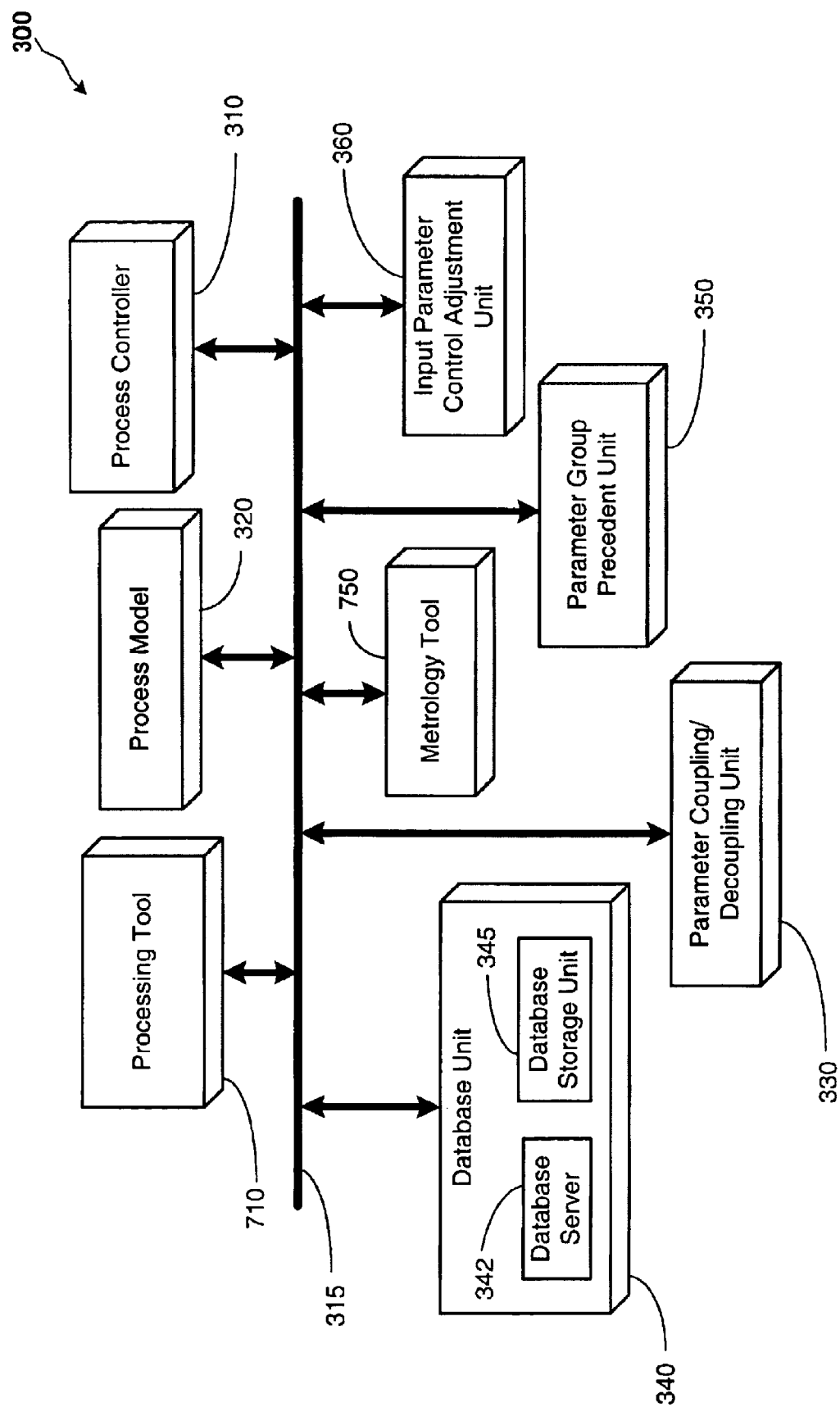
FIG. 3 provides a block diagram representation of a system in accordance with one illustrative embodiment of the present invention.

Turning now to FIG. 3, a system 300 in accordance with embodiments of the present invention is illustrated. A process controller 310 in the system 300 is capable of controlling various operations relating to a processing tool 710. The system 300 is capable of acquiring manufacturing related data, such as metrology data related to processed semiconductor wafers 105, tool state data, and the like. The system 300 may comprise a metrology tool 750 to acquire metrology data related to the processed semiconductor wafers 105.

The system 300 may also comprise a database unit 340. The database unit 340 is provided for storing a plurality of types of data, such as manufacturing-related data, data related to the operation of the system 300 (e.g., the status of the processing tool 710, the status of semiconductor wafers 105, etc.). The database unit 340 may store tool state data relating to a plurality of process runs performed by the processing tool 710. The database unit 340 may comprise a database server 342 for storing tool state data and/or other manufacturing data related to processing semiconductor wafers 105, into a database storage unit 345.

A process model 320 associated with the system 300 is capable of modeling the operation and process results of a variety of parameters relating to the operation of the system 300. The process model 320 may model certain results based upon a plurality of inputs that are plugged into values of control input parameters. The process model 320 is capable of providing modification data to modify control input parameters.

The system 300 also comprises a parameter coupling/decoupling unit 330. The parameter coupling/decoupling unit 330 comprises algorithms that are capable of selecting particular control input parameters and either grouping them together (i.e., a coupling function), or separating them such that modification of one control input parameter does not affect the other (i.e., a decoupling function). The parameter coupling/decoupling unit 330 is capable of producing a plurality of parameter lists that group or separate certain control input parameters that are used to perform process operations on the semiconductor wafers 105. A more detailed description of the parameter coupling/decoupling unit 330 is provided in FIG. 4 and accompanying description below.

Based upon the grouping list provided by the parameter coupling/decoupling unit 330, a parameter group precedent unit 350 may assign particular priority to particular grouping lists. The parameter group precedent unit 350 is capable of selecting certain groups of control input parameters that may be given priority when modification of control parameters is called for by the process model 320. The parameter group precedent unit 350 is capable of producing a plurality of modification lists that group certain control input parameters for modification in a prioritized manner. A more detailed description of the parameter group precedent unit 350 is provided in FIG. 5 and accompanying description below.

An input parameter control adjustment unit 360 utilizes feedback or feed-forward adjustment data from the process model 320 to modify certain control input parameters based upon the modification list provided by the parameter group precedent unit 350. The input parameter control adjustment unit 360 is capable of implementing the feedback and/or feed-forward adjustments to modify the behavior of the process operations performed by the system 300. Therefore, the system 300 is capable of selecting certain groups of control input parameters to be modified in a prioritized manner such that the possibility of inadvertent modification of control input parameter state(s) is reduced.

The process controller 310, the process model 320, the parameter coupling/decoupling unit 330, the parameter group precedent unit 350, and/or the input parameter control adjustment unit 360, may be software, hardware, or firmware unit(s) that are standalone units or may be integrated into a computer system associated with the system 300. Furthermore, the various components represented by the blocks illustrated in FIG. 3 may communicate with one another via a system communications line 315. The system communications line 315 may be a computer bus link, a dedicated hardware communications link, a telephone system communications link, a wireless communications link, or other communication links that may be implemented by those skilled in the art having benefit of the present disclosure.

Figure 4:
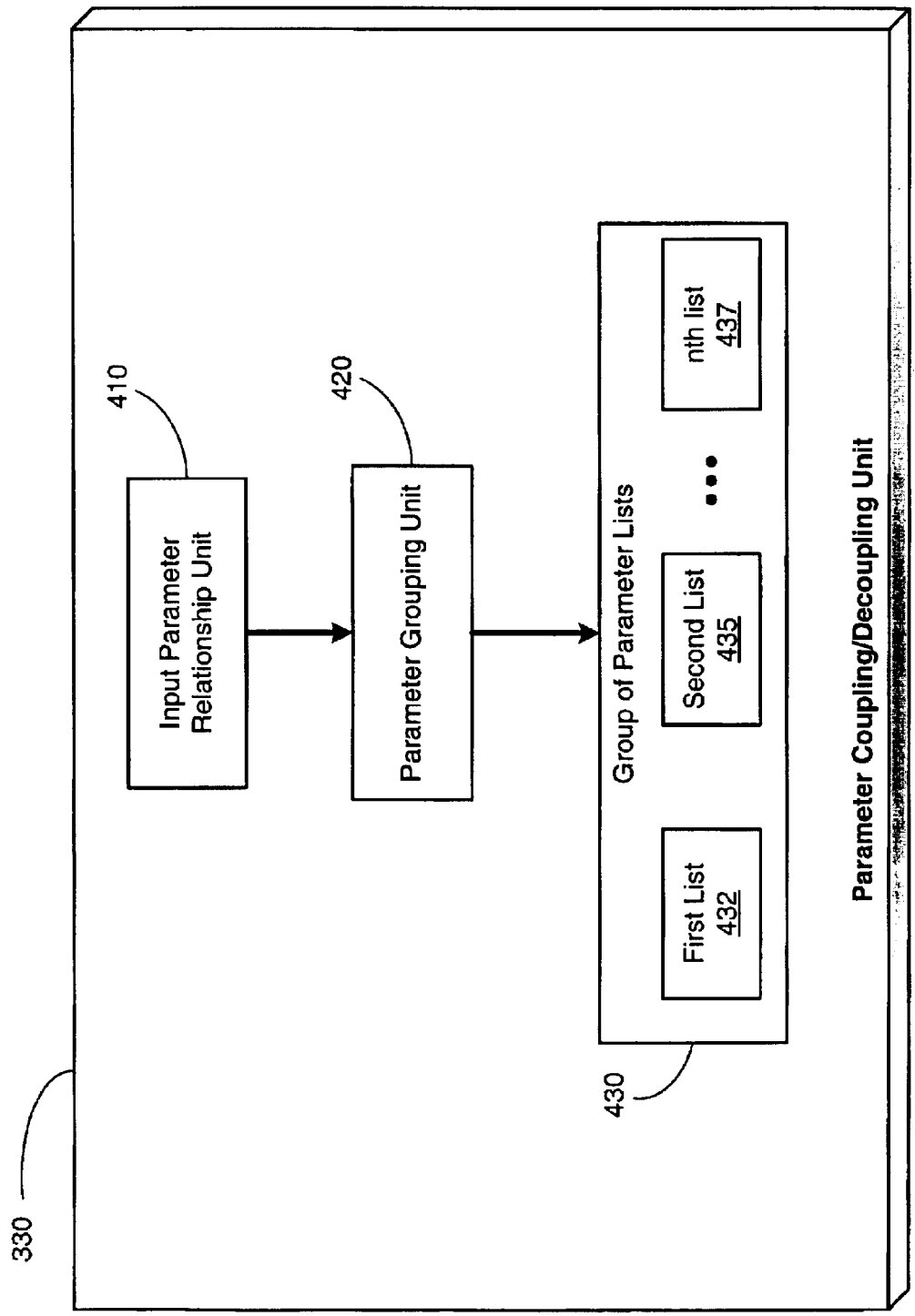
FIG. 4 illustrates a more detailed block diagram representation of a parameter coupling/decoupling unit of FIG. 3, in accordance with one illustrative embodiment of the present invention.

Turning now to FIG. 4, a more detailed block diagram illustration of the parameter coupling/decoupling unit 330 from FIG. 3 is illustrated. The parameter coupling/decoupling unit 330 may comprise an input parameter relationship unit 410 that is capable of grouping and developing relationships between certain control input parameters. For example, the input parameter relationship unit 410 may group certain non-translational control parameters and group them together. A parameter grouping unit 420 may then accept data from the input parameter relationship unit 410 and perform a grouping function. For example, the parameter grouping unit 420 may group certain non-translational parameters together and group translation parameters in a different group. Based upon the grouping performed by the parameter grouping unit 420, a group of parameter lists 430 is generated. The parameter lists 430 may comprise a first list 432, a second list 435 through an $n^{th}$ list 437. As an example, each list may comprise translational control input parameters combined together with non-translational input control parameters. The system 300 is capable of utilizing these lists to create a prioritized process of modifying control input parameters for feedback and/or feed-forward purposes.

Figure 5:
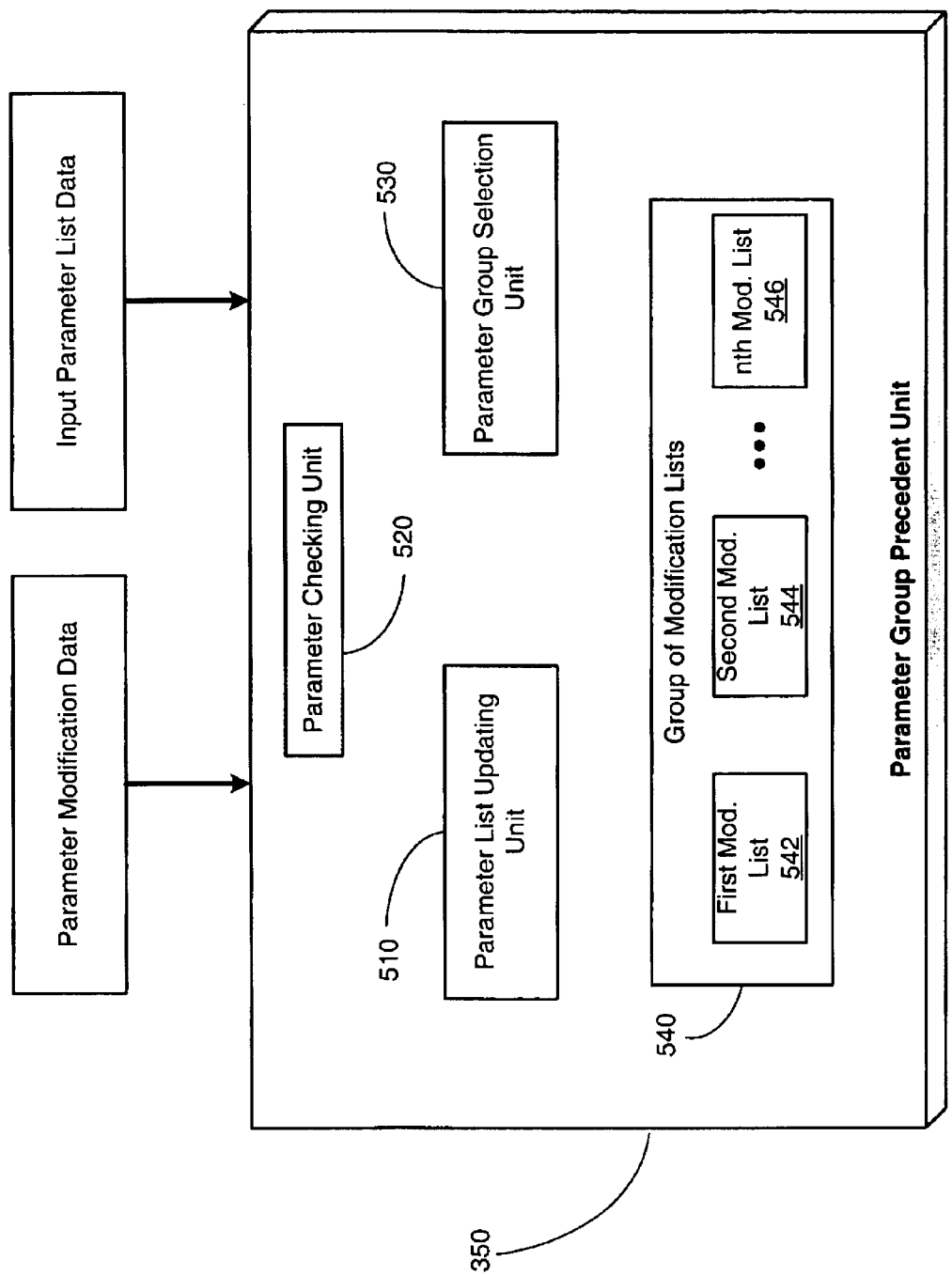
FIG. 5 illustrates a more detailed block diagram representation of a parameter group precedent unit of FIG. 3, in accordance with one illustrative embodiment of the present invention.

Turning now to FIG. 5, a more detailed block diagram depiction of the parameter group precedent unit 350 of FIG. 3 is illustrated. The parameter group precedent unit 350 may receive parameter modification data from the process model 320. The parameter modification data may include feedback correction data and/or feed-forward correction data to compensate for existing errors detected on semiconductor wafers 105. The parameter group precedent unit 350 may also receive control input parameter list data from the parameter coupling/decoupling unit 330, which may provide a plurality of lists (i.e., the first through $n^{th}$ list 432, 435, 437) of control input parameters that are grouped or decoupled. A parameter checking unit 520 in the parameter group precedent unit 350 may check each control input parameter in the parameter lists 430 to see if an actual modification of control input parameter(s) is required. For example, a deadband analysis on a control input parameter may be performed where even though a modification is requested, if it is within a deadband, such request may not be processed.

The parameter group precedent unit 350 also comprises a parameter list updating unit 510, which is capable of updating a grouping list of input control parameters based upon results from the parameter checking unit 520. The parameter checking unit 520 may determine that certain modifications to a control input parameter may be within a deadband, therefore, no updating of the list is performed by the parameter list updating unit 510. Based upon the checks performed by the parameter checking unit 520, the parameter list updating unit 510 updates the group of lists 430 by tagging, for example, the control input parameters in each group for modification. A parameter group selection unit 530 may then select a group of control input parameters to modify based upon the updated lists. For example, the parameter group selection unit 530 may select a set of non-translational control input parameters instead of translational parameters to modify. The parameter group precedent unit 350 then produces parameter modification lists 540. The parameter modification lists 540 may comprise a first modification list 542, a second modification list 544 through an $n^h$ modification list 546 as a result of the check(s) and selection(s) of the groups of control input parameters that are to be modified. The process controller 310 may then utilize the modification lists 542, 544, 546 to modify the control input parameters to implement feedback and/or feed-forward adjustments to processes performed by the system 300.

Turning now to FIG. 6, an exemplary list of groups of control input parameters is illustrated. In Case #1, there are two groups of control input parameters, Group I and Group II. For example, Group I comprises non-translational control input parameters and Group II comprises translational control input parameters. Group I comprises, for example, non-translation parameters, such as y-scale, x-scale, non-orthoganality parameter, magnification parameter, and intrafield rotation parameters. The translational group, Group II, may comprise x-translation and y-translation parameters. The list under the "Before Check" column corresponds to the parameter lists 430 produced by the parameter coupling/decoupling unit 330, which decouples certain parameters from other parameters. Therefore, non-translational parameters in Group I are coupled together within the Group I and the Group I parameters are decoupled and separated from the translational parameters in Group II. The group designations under the "After Check" column corresponds to the parameter modification lists 540 produced by the parameter group precedent unit 350, which, after a check, tags or approves certain control input parameters to be modified. The example illustrated in FIG. 6 shows that for Case #1, the parameter group precedent unit 350 does not require modification to any control input parameters in Group I and Group II. Therefore, the second set of columns, i.e., the "After Check" column, shows that no control input parameters were changed in Group I and Group II.

In Case #2, two control input parameters are required to be adjusted by the parameter group precedent unit 350, for example, for performing feedback control modifications. However, the Group II non-translational parameters are not required to be changed. Therefore, under the "After Check" column, which relates to the check performed by the parameter checking unit 520 in the parameter group precedent unit 350, the system 300 may modify the two tagged control input parameters (designated with a "star" symbol) in Group I. Alternatively, the system 300 may modify all parameters in Group I and modify none of parameters in Group II. Therefore, the parameters that are modified that may affect each other are in Group I and all are modified, and the parameters in Group II, which should not be affected by the changes in the parameters of Group I are not modified, therefore, a decoupling of certain control input parameters is achieved. Without the decoupling described above, even though modifications to Group I, for example, may affect Group II, modifications to Group II may not affect Group I. However, by implementing the decoupling process taught by embodiments of the present invention, due to the implemented decoupling, modifications to Group I are less likely to substantially affect Group II.

In Case #3, under the "Before Check" column, only Group II parameters are tagged for modification by the parameter group precedent unit 350 for performing feedback and/or feed-forward adjustments. After the parameter group precedent unit 350 performs a check, the parameter group precedent unit 350 may determine that the tagged parameter in Group II is the only parameter to be modified. Alternatively, the parameter group precedent unit 350 may determine that all parameters in Group II are to be modified and none of the parameters in Group I are to be modified.

In Case #4, under the "Before Check" column, parameters in Groups I and II are tagged to be modified by the parameter group precedent unit 350 to perform feedback/feed forward adjustments. After the check, the parameter group precedent unit 350 may determine that the precedent goes to modifying parameters in Group I, and none of the parameters in Group II or modifications to all of the parameters in Group I and none of the parameters in Group II. Therefore, a priority is set up for modifying certain parameters in certain groups. Consequently, modifications to certain parameters may not affect other control input parameters, which allows for more accurate and reactive feedback and/or feed-forward process adjustments. The examples illustrated in FIG. 6 are for illustrative purposes only and not meant as an exhaustive list, other combinations of groups and precedent priority standards may be implemented by those skilled in the art having benefit of the present disclosure, and remain within the spirit of the present invention.

Figure 7:
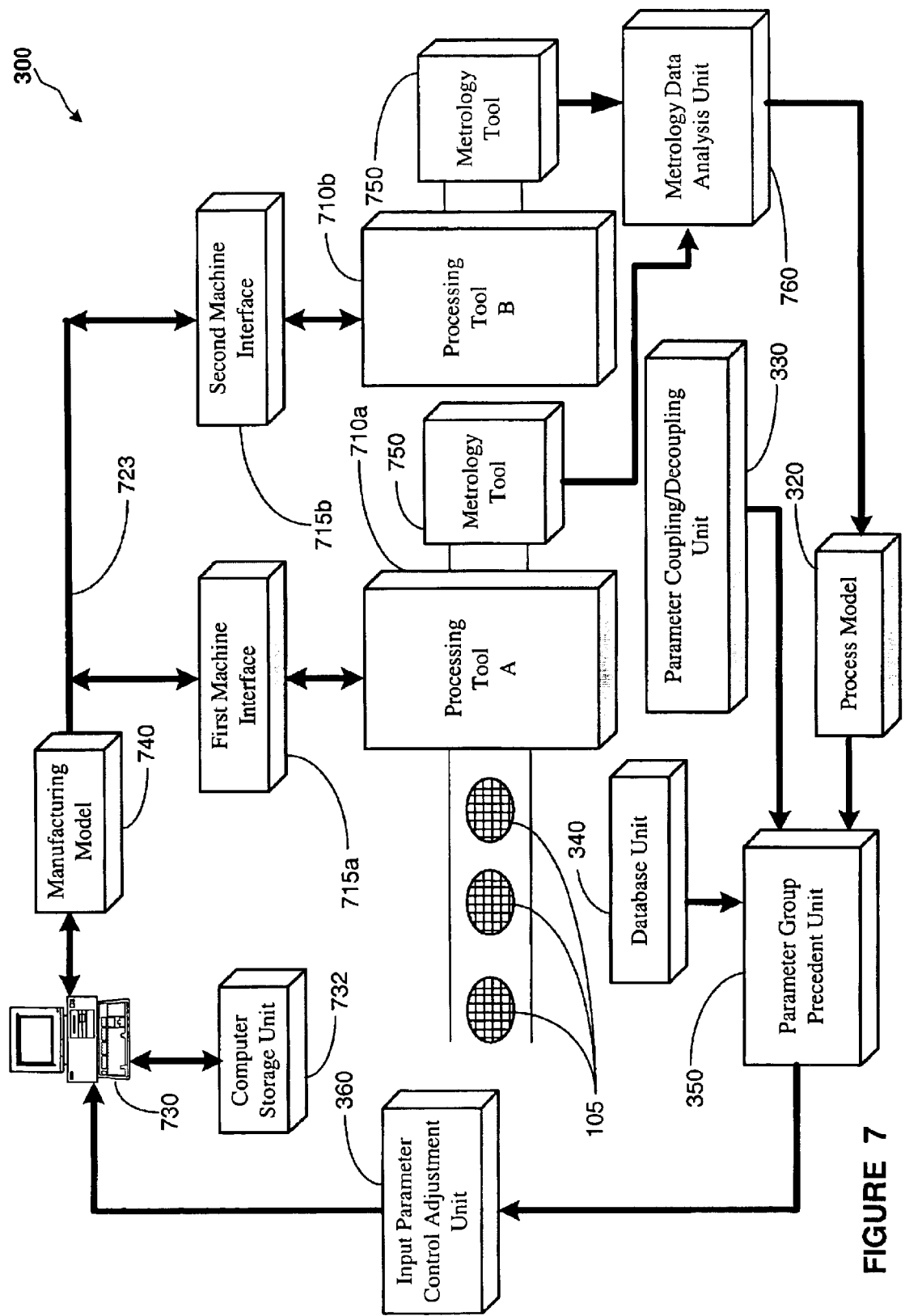
FIG. 7 illustrates a more detailed block diagram representation of the system shown in FIG. 3, in accordance with one illustrative embodiment of the present invention.

Turning now to FIG. 7, a more detailed block diagram of the system 300 in accordance with one embodiment of the present invention is illustrated. Semiconductor wafers 105 are processed on processing tools 710a, 710b using a plurality of control input signals, or manufacturing parameters, provided via a line or network 723. The process performed by the processing tools 710a, 710b may include photolithography processes, deposition processes, etch processes, chemical-mechanical polishing (CMP) processes, ion implant processes, and the like. The control input signals, or manufacturing parameters, on the line 723 are sent to the processing tools 710a, 710b from a computer system 730 via machine interfaces 715a, 715b. The first and second machine interfaces 715a, 715b are generally located outside the processing tools 710a, 710b. In an alternative embodiment, the first and second machine interfaces 715a, 715b are located within the processing tools 710a, 710b. The semiconductor wafers 105 are provided to and carried from a plurality of processing tools 710. In one embodiment, semiconductor wafers 105 may be provided to a processing tool 710 manually. In an alternative embodiment, semiconductor wafers 105 may be provided to a processing tool 710 in an automatic fashion (e.g., robotic movement of semiconductor wafers 105). In one embodiment, a plurality of semiconductor wafers 105 is transported in lots (e.g., stacked in cassettes) to the processing tools 710.

In one embodiment, the computer system 730 sends control input signals, or manufacturing parameters, on the line 723 to the first and second machine interfaces 715a, 715b. The computer system 730 is capable of controlling processing operations. In one embodiment, the computer system 730 is a process controller. The computer system 730 is coupled to a computer storage unit 732 that may contain a plurality of software programs and data sets. The computer system 730 may contain one or more processors (not shown) that are capable of performing the operations described herein. The computer system 730 employs a manufacturing model 740 to generate control input signals on the line 723. In one embodiment, the manufacturing model 740 contains a manufacturing recipe that determines a plurality of control input parameters that are sent on the line 723 to the processing tools 710a, 710b.

In one embodiment, the manufacturing model 740 defines a process script and input control that implement a particular manufacturing process. The control input signals (or control input parameters) on the line 723 that are intended for processing tool A 710a are received and processed by the first machine interface 715a. The control input signals on the line 723 that are intended for processing tool B 710b are received and processed by the second machine interface 715b. Examples of the processing tools 710a, 710b used in semiconductor manufacturing processes are steppers, etch process tools, deposition tools, and the like.

One or more of the semiconductor wafers 105 that are processed by the processing tools 710a, 710b can also be sent to a metrology tool 750 for acquisition of metrology data. The metrology tool 750 may be a scatterometry data acquisition tool, an overlay-error measurement tool, a critical dimension measurement tool, and the like. The metrology tool 750 may acquire metrology data such as critical dimension measurements of a feature formed on the semiconductor wafer 105, film thickness of a layer formed on the semiconductor wafer 105, and the like. In one embodiment, a metrology tool 750 examines one or more processed semiconductor wafers 105. The metrology data analysis unit 760 may collect, organize, and analyze data from the metrology tool 750. The metrology data is directed to a variety of physical or electrical characteristics of the devices formed across the semiconductor wafers 105. For example, metrology data may be obtained as to line width measurements, depth of trenches, sidewall angles, thickness, resistance, and the like. Metrology data may be used to determine faults that may be present across the processed semiconductor wafers 105, which may be used to quantify the performance of the processing tools 710.

As provided above, the process model 320 may receive metrology data from the metrology data analysis unit 760 and/or data from the database unit 340. The process model 320 may send modification data to the parameter group precedent unit 350, which also receives grouping data, and group lists from the parameter coupling/decoupling unit 330. The parameter group precedent unit 350, as mentioned above, provides modification data for modifying certain control input parameters to the input parameter control adjustment unit 360, which may provide feedback and/or feed-forward control adjustment data to the computer system 730. The computer system 730 may implement the modifications determined by the input parameter control adjustment unit 360.

Figure 8:
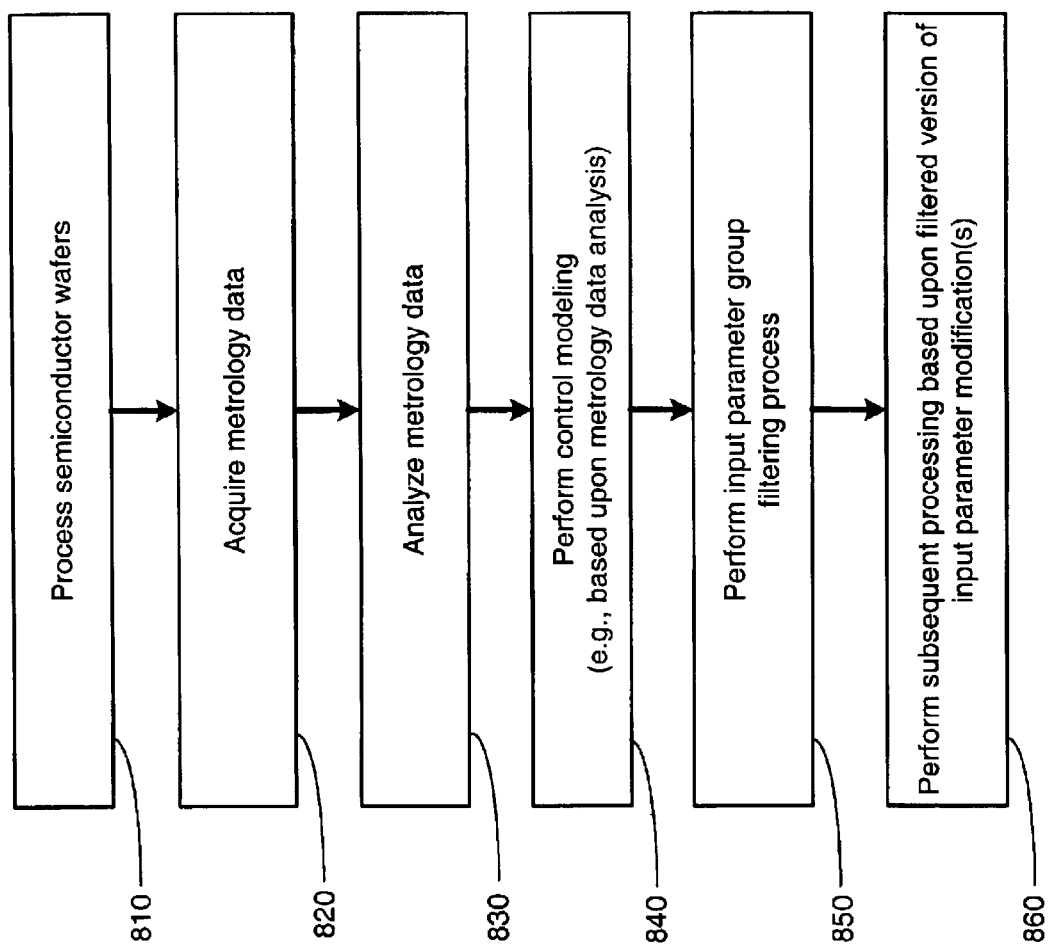
FIG. 8 illustrates a flowchart depiction of a method in accordance with one illustrative embodiment of the present invention.

Turning now to FIG. 8, a flow chart depiction of a method in accordance with embodiments of the present invention is illustrated. The system 300 processes semiconductor wafers 105 using the process controller 310 to control processing of the semiconductor wafers 105 (block 810). The system may then acquire metrology data using the metrology tool 650 (block 820). The metrology data is then analyzed to check for errors and examine the accuracy of the processing of semiconductor wafers 105 (block 830). The system 300 may the perform control modeling using a process model 320 to model the performance of the processing and the condition of the semiconductor wafers 105 (block 840). The control modeling may also include calculating feedback and/or feed-forward adjustments to reduce subsequent errors on subsequently processed semiconductor wafers 105 and/or to compensate for errors on processed semiconductor wafers 105.

Figure 9:
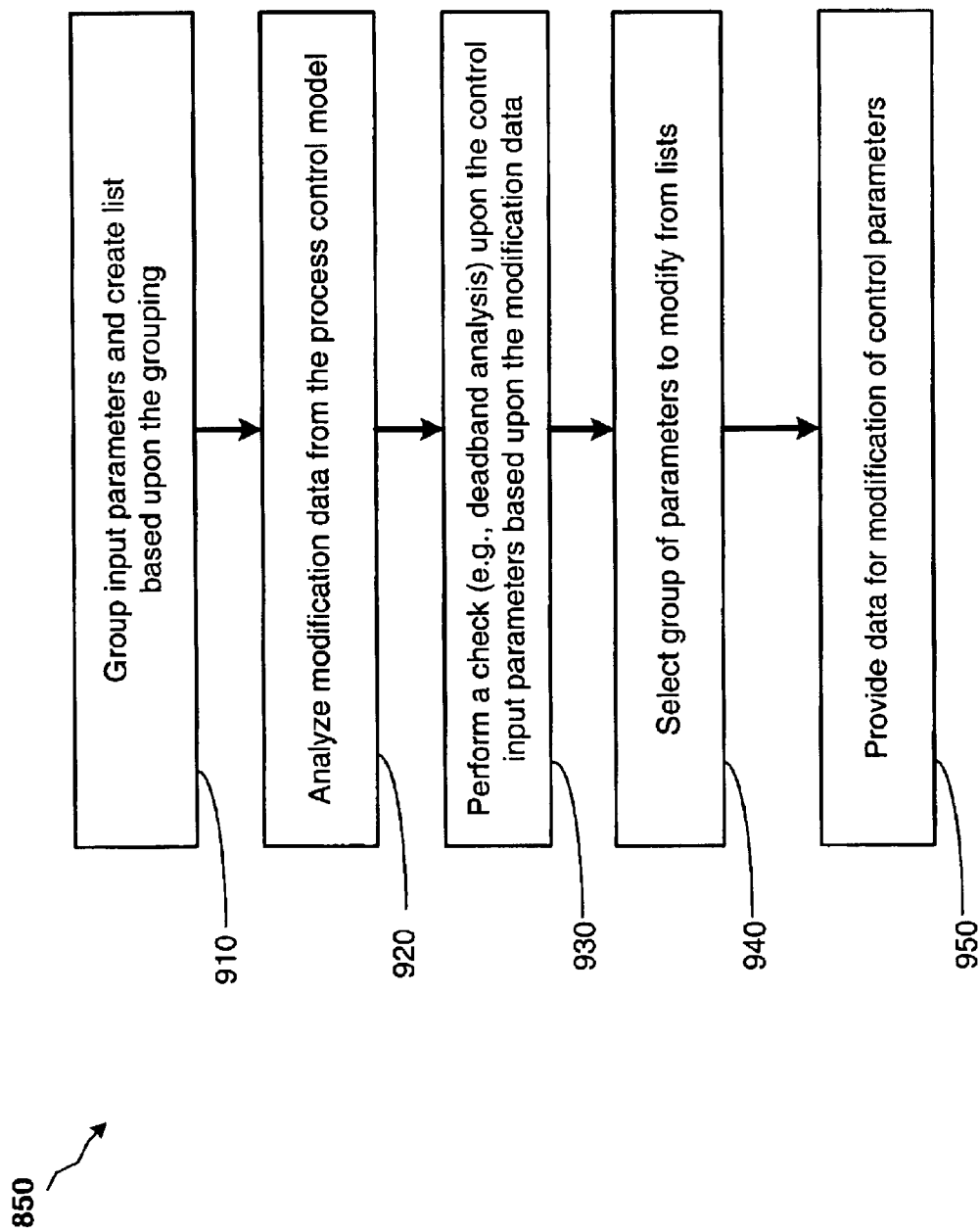
FIG. 9 illustrates a more detailed flowchart depiction of a method of performing an input parameter group filtering process, as indicated in FIG. 8, in accordance with one illustrative embodiment of the present invention.

Upon performing the control modeling, which may provide feedback and/or feed-forward adjustment data, the system 300 may perform an input parameter group filtering process (filtering process) (block 850). The filtering process may include filtering-out certain modifications for various reasons, such as modifications being within a deadband. The input parameter group filtering process may also include grouping certain control input parameters together and separating other control input parameters such that modifications to one parameter does not undesirably affect the characteristics, the value, or the states of other control input parameters. The group parameter filtering process also includes establishing a priority protocol for modifying certain control input parameters. Therefore, the filtering process provides for selective modifications to control input parameters based upon the feedback or feed-forward adjustment data. A more detailed description of the input parameter group filtering process indicated in block 850 is illustrated in FIG. 9 and accompanying description below. Upon receiving data from the filtering process, the system 300 may perform subsequent processes based upon the filtered version of modifications of the control input parameter(s) (block 860). Therefore, a more accurate and control input modification and implementation of feedback and feed-forward modifications is provided.

Turning now to FIG. 9, a more detailed flow chart depiction of the method for performing the input parameter group filtering process indicated in block 850 of FIG. 8 is illustrated. The system 300 may group a plurality of control input parameters and create a list based upon such grouping (block 910). The groupings may include grouping together certain control input parameters that may affect each other upon modification of a parameter. The groupings may also include isolated control input parameters, which are decoupled such that modification to one control input parameter is less likely to affect the other. Upon grouping the control input parameters, the system 300 analyzes the modification data from the process model 320 to tag certain control input parameters for modification (block 920). The system 300 may then perform a check, such as a deadband analysis based upon the modification data to determine whether to actually modify certain control input parameters and not modify other parameters if they are found to be within a predetermined range of tolerance (block 930).

The system 300 may then select a group of parameters to modify from the group lists, i.e., create modification lists 540 based upon the group lists 430 (block 940). The modification list comprises tagged control input parameters after a deadband check and a prioritized decision to modify certain control input parameters in certain groups. The modification list, which contains data for modifying certain control input parameters, is sent to the process controller 310 to implement the feedback and/or feed forward modifications in a more precise manner (block 950).

Utilizing implementations of the present invention, more accurate implementation of feedback and/or feed-forward adjustments are made possible. Modifications to certain control input parameters may affect other control input parameters and this relationship may be used to group and/or isolate other control input parameters such that only desired modifications to control input parameters are implemented. Therefore, more efficient and accurate controlling of processing of semiconductor wafers 105 is made possible.

The principles taught by the present invention can be implemented in an Advanced Process Control (APC) Framework, such as a Catalyst system offered by KLA Tencor, Inc. The Catalyst system uses Semiconductor Equipment and Materials International (SEMI) Computer Integrated Manufacturing (CIM) Framework compliant system technologies, and is based on the Advanced Process Control (APC) Framework. CIM (SEMI E81-0699-Provisional Specification for CIM Framework Domain Architecture) and APC (SEMI E93-0999-Provisional Specification for CIM Framework Advanced Process Control Component) specifications are publicly available from SEMI. The APC framework is a preferred platform from which to implement the control strategy taught by the present invention. In some embodiments, the APC framework can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC framework allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    acquiring manufacturing data relating to a processing of a workpiece, said manufacturing data comprising metrology data relating to said processed workpiece;
    determining an adjustment for at least one of a first and a second control input parameter based upon said manufacturing data; and
    organizing said first and second control input parameters to isolate said first control input parameter from said second control input parameter for adjusting at least one of said first and said second control input parameters, using a controller.

2. The method of claim 1, wherein performing said process upon said workpiece farther comprises performing said process upon a semiconductor wafer.

3. The method of claim 1, further comprising grouping a third control input parameter with said first control input parameter based upon a relationship between said first and said third control input parameters.

4. The method of claim 3, further comprising determining a modification precedent for modifying at least one of said first and second control input parameters.

5. The method of claim 3, wherein grouping said third control input parameter with said first control input parameter based upon said relationship between said first and said first control input parameters further comprises grouping translational parameters.

6. The method of claim 3, wherein grouping said third control input parameter with said first control input parameter based upon said relationship between said first and said third control input parameters further comprises grouping non-translational parameters.

7. The method of claim 3, wherein grouping said third control input parameter with said first control input parameter further comprises generating a parameter modification list for prioritizing and isolating a plurality of parameters for modification.

8. The method of claim 1, wherein acquiring manufacturing data relating to said processing of said workpiece further comprises acquiring manufacturing data relating to a photolithography process.

9. The method of claim 1, wherein organizing said first and said second control input parameters to isolate said first control input parameter from said second control input parameter further comprises grouping said first and said second control input parameters such that modification to said first control input parameter does not substantially affect said second control input parameter.

10. The method of claim 1, further comprising performing a deadband analysis for adjusting at least one of said first and said second control input parameters.

11. The method of claim 1, further comprising processing an additional workpiece.

12. A method, comprising:
    processing a workpiece based upon first, second, an third control input parameters;
    acquiring manufacturing data relating to said processing of said workpiece, said manufacturing data comprising metrology data relating to said processed workpiece;
    determining an adjustment for at least one of said first, second, and third control input parameters based upon said manufacturing data; and
    organizing said first and said second control input parameters for said adjustment and to isolate said third control input parameter from being substantially affected by said adjustment, using a controller.

13. The method of claim 12, wherein processing a workpiece further comprises performing a photolithography process upon said workpiece.

14. The method of claim 12, further comprising determining a priority for modifying at least one of said first and said third control input parameters.

15. The method of claim 12, wherein performing said process upon said workpieces further comprises performing said process upon a semiconductor wafer.

16. An apparatus, comprising:
    means for acquiring manufacturing data relating to a processing of a workpiece, said manufacturing data comprising metrology data relating to said processed workpiece;
    means for determining an adjustment for at least one of a first and a second control input parameter based upon said manufacturing data; and
    means for organizing said first and said second control input parameters to isolate said first control input parameter from said second control input parameter for adjusting at least one of said first and said second control input parameters, using a controller.

17. A system, comprising:
    a processing tool to process a workpiece based upon a plurality of control input parameters; and
    a controller operatively coupled to said processing tool, said controller to create a plurality of control input parameter lists based upon a relationship between at least two of said control input parameters to isolate at least one control input parameter from another; said controller also to select at least one of said lists of control input parameters for parameter adjustment based upon a modification precedent.

18. The system of claim 17, wherein said workpiece is a semiconductor wafer.

19. The system of claim 17, further comprising:
    a metrology tool operatively coupled to said process controller and to said processing tool, said metrology tool to acquire metrology data relating to said processed workpiece;
    a process model operatively coupled to said process controller, said process model to generate at least one of feedback and feed-forward data based upon said metrology tool;
    a parameter coupling/decoupling unit operatively coupled to said process controller, said parameter coupling/decoupling unit to perform at least one of grouping and isolating said control input parameters; and
    a parameter group precedent unit operatively coupled to said parameter coupling/decoupling unit, said parameter group precedent unit to generate a modification precedent to create a hierarchy for modifying a group of said control input parameters.

20. The system of claim 19, further comprising a database unit to store said metrology data.

21. The system of claim 17, further comprising said processing tool to process an additional workpiece.

22. An apparatus, comprising:
    a controller to control a process operation performed by a processing tool upon a workpiece, said controller also to create a plurality of control input parameter lists based upon a relationship between at least two of said control input parameters to isolate at least one control input parameter from another and to select at least one of said lists of control input parameters for parameter adjustment based upon a modification precedent.

23. The apparatus of claim 22, wherein said workpiece is a semiconductor wafer.

24. The apparatus of claim 22, further comprising:
a metrology tool operatively coupled to said process controller and to said processing tool, said metrology tool to acquire metrology data relating to said processed workpiece;
a process model operatively coupled to said process controller, said process model to generate at least one of feedback and feed-forward data based upon said metrology tool;
a parameter coupling/decoupling unit operatively coupled to said process controller, said parameter coupling/decoupling unit to perform at least one of grouping and isolating said control input parameters; and
a parameter group precedent unit operatively coupled to said parameter coupling/decoupling unit, said parameter group precedent unit to generate a modification precedent to create a hierarchy for modifying a group of said control input parameters.

25. The apparatus of claim 24, further comprising a database unit to store said metrology data.

26. The apparatus of claim 22, further comprising said process controller being adapted to control a processing of an additional workpiece.

27. A computer readable program storage device encoded with instructions that, when executed by a computer, performs a method, comprising:
acquiring manufacturing data relating to a processing of a workpiece, said manufacturing data comprising metrology data relating to said processed workpiece;
determining an adjustment for at least one of a first and a second control input parameter based upon said manufacturing data; and
organizing said first and said second control input parameters to isolate said first control input parameter from said second control input parameter for adjusting at least one of said first and said second control input parameters, using a controller.

28. The computer readable program storage device encoded with instructions that, when executed by a computer, performs the method of claim 27, wherein performing said process upon said workpiece further comprises performing said process upon a semiconductor wafer.

29. The computer readable program storage device encoded with instructions that, when executed by a computer, performs the method of claim 27, further comprising grouping a third control input parameter with said first control input parameter based upon a relationship between said first and said third control input parameters.

30. The computer readable program storage device encoded with instructions that, when executed by a computer, performs the method of claim 29, further comprising determining a modification precedent for modifying at least one of said first and said second control input parameter.

31. The computer readable program storage device encode with instructions that, when executed by a computer, performs the method of claim 29, wherein grouping said third control input parameter with said first control input parameter based upon said relationship between said first and said third control input parameters further comprises grouping translational parameters.

32. The computer readable program storage device encoded with instructions that, when executed by a computer, performs the method of claim 29, wherein grouping said third control input parameter with said first control input parameter based upon said relationship between said first and said third control input parameters further comprises grouping non-translational parameters.

33. The computer readable program storage device encoded with instructions that, when executed by a computer, performs the method of claim 29, wherein grouping said third control input parameter with said first control input parameter further comprises generating a parameter modification list for prioritizing and isolating a plurality of parameters for modification.

34. The computer readable program storage device encoded with instructions that, when executed by a computer, performs the method of claim 27, wherein acquiring manufacturing data relating to said processing of said workpiece further comprises acquiring manufacturing data relating to a photolithography process.

35. The computer readable program storage device encoded with instructions that, when executed by a computer, performs the method of claim 27, wherein organizing said first and second control input parameters to isolate said first control input parameter from said second control input parameter further comprises grouping said first and second control input parameters such that modification to said fist control input parameter does not substantially affect said second control input parameter.

36. The computer readable program storage device encoded with instructions that, when executed by a computer, performs the method of claim 27, further comprising performing a deadband analysis for adjusting at least one of said first and said second control input parameters.

37. The computer readable program storage device encoded with instructions that, when executed by a computer, performs the method of claim 27, further comprising processing an additional workpiece.

* * * * *

UNITED STATES PATENT AND TRADEMARK OFFICE
CERTIFICATE OF CORRECTION

PATENT NO. : 6,912,436 B1
DATED : June 28, 2005
INVENTOR(S) : Jones et al.

It is certified that error appears in the above-identified patent and that said Letters Patent is hereby corrected as shown below:

Column 13,
Line 15, change "farther" to -- further --.
Line 56, change "an" to -- and --.

Column 14,
Line 27, add -- process -- between "a" and "controller".

Column 15,
Line 28, add -- process -- before "controller".

Column 16,
Line 39, change "fist" to -- first --.

Signed and Sealed this

Twenty-seventh Day of December, 2005

JON W. DUDAS
*Director of the United States Patent and Trademark Office*